United States Patent [19]
Richardson et al.

[11] Patent Number: 5,192,108
[45] Date of Patent: Mar. 9, 1993

[54] PROTECTIVE EQUIPMENT COMPARTMENT FOR TRUCKS

[75] Inventors: Donald A. Richardson; James E. Schatzer, both of Renton, Wash.

[73] Assignee: Paccar Inc., Bellevue, Wash.

[21] Appl. No.: 818,167

[22] Filed: Jan. 8, 1992

[51] Int. Cl.⁵ .......................................... B60R 11/00
[52] U.S. Cl. .................................. 296/37.1; 180/89.16
[58] Field of Search ..................... 296/190, 37.1, 37.6; 180/89.14–89.19

[56] References Cited

U.S. PATENT DOCUMENTS

| | | | |
|---|---|---|---|
| 2,699,223 | 1/1955 | Brumbaugh | 180/89.14 |
| 2,868,310 | 1/1959 | Lee | 180/89.17 |
| 3,055,699 | 9/1962 | May | 296/190 |
| 3,866,969 | 2/1975 | Sandrock et al. | 296/190 |
| 4,062,582 | 12/1977 | Youmans | 296/190 |
| 4,921,062 | 5/1990 | Marlowe | 180/89.14 |
| 5,004,062 | 4/1991 | Foot | 296/190 X |

Primary Examiner—Robert R. Song
Attorney, Agent, or Firm—Seed and Berry

[57] ABSTRACT

A truck cab of the cab-over-engine design having equipment compartments adjacent the front of the engine compartment adjacent the radiator and grill. The equipment compartment includes an opening substantially at the front of the truck cab having a pivot-mounted corner panel for closing the equipment compartment and for forming an exterior surface of the truck cab. The pivot mounting pivots the corner panel forward as the corner panel rotates so that the corner panel may be rotated through approximately 180 degrees while also providing a surface flush with the remainder of the truck cab when the corner panel closes the equipment compartment.

14 Claims, 2 Drawing Sheets

PROTECTIVE EQUIPMENT COMPARTMENT FOR TRUCKS

TECHNICAL FIELD

This invention generally relates to truck cabs. More particularly, it relates to an externally accessible equipment compartment for a truck cab of the cab-over-engine design.

BACKGROUND OF THE INVENTION

Modern truck cabs are frequently of the cab-over-engine (COE) design. COE truck cabs have an operating compartment with a seat mounted over the truck engine.

Since the truck cab encloses the engine compartment accessibility to the engine and support equipment, such as electrical circuit breakers and heating and air conditioning equipment, is restricted. One known prior art design includes a horizontal hinge-mounted front panel that extends the full width across the front of the cab. While this prior art panel provides access to the engine compartment, it is heavy and requires large, strong hinges and gas cylinders to assist upward movement of the panel.

SUMMARY OF THE INVENTION

It is an object of the present invention to provide quick access to a truck's support equipment.

It is still another object of the present invention to provide an externally accessible compartment and corner panel which efficiently uses space and which, when closed, provides a surface flush with the other portions of the truck cab.

It is another object of the present invention to provide an externally accessible forward cab compartment for retaining a truck's support equipment.

These and other objects of the present invention, which will be obvious to those skilled in the art, are provided in a COE truck cab. An engine compartment is formed having a forward firewall extending inwardly to the radiator, thence forward to form a corner compartment. A corner panel for closing the equipment compartment is mounted using a vertical pivot mount. The corner panel can be rotated on the pivot mount, which pivots the corner panel outward, to open the compartment. Preferably, the corner panel is held closed by easily removable fasteners. When in the closed position, the corner panel fits flush with the remainder of the truck cab.

The novel features and the advantages of the invention, as well as other objects thereof, will be understood more fully after reading the following detailed description and after reference to the accompanying drawings.

DETAILED DESCRIPTION OF THE INVENTION

Figure 1:
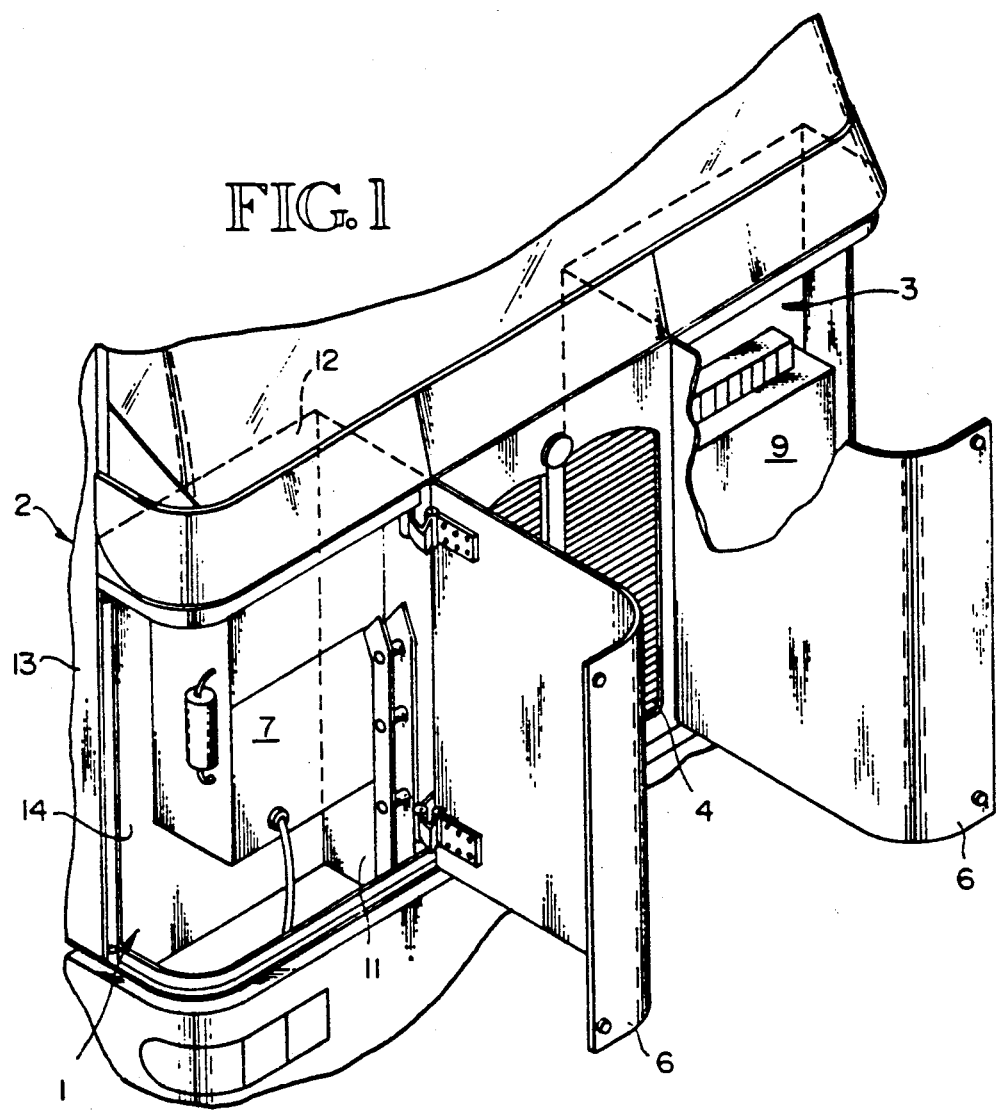
FIG. 1 is an enlarged isometric view of the COE cab showing the corner panel opened to expose the corner compartment.

Referring now to FIG. 1, the preferred embodiment employs left and right corner or equipment compartments 1, 3 formed at the front of a COE cab 2 forward of the engine compartment adjacent the grill 4. Equipment compartments are preferably formed on both the operator's side and the passenger's side of the truck and are closed by corner panels 6 which define the front outer surface of the cab 2. In one embodiment the truck's heating and air conditioning equipment 7 is located in the passenger's side equipment compartment while the operator's side equipment compartment contains the truck's pneumatic and electrical lines and the electrical circuit breakers and junction boxes 9.

Figure 2:
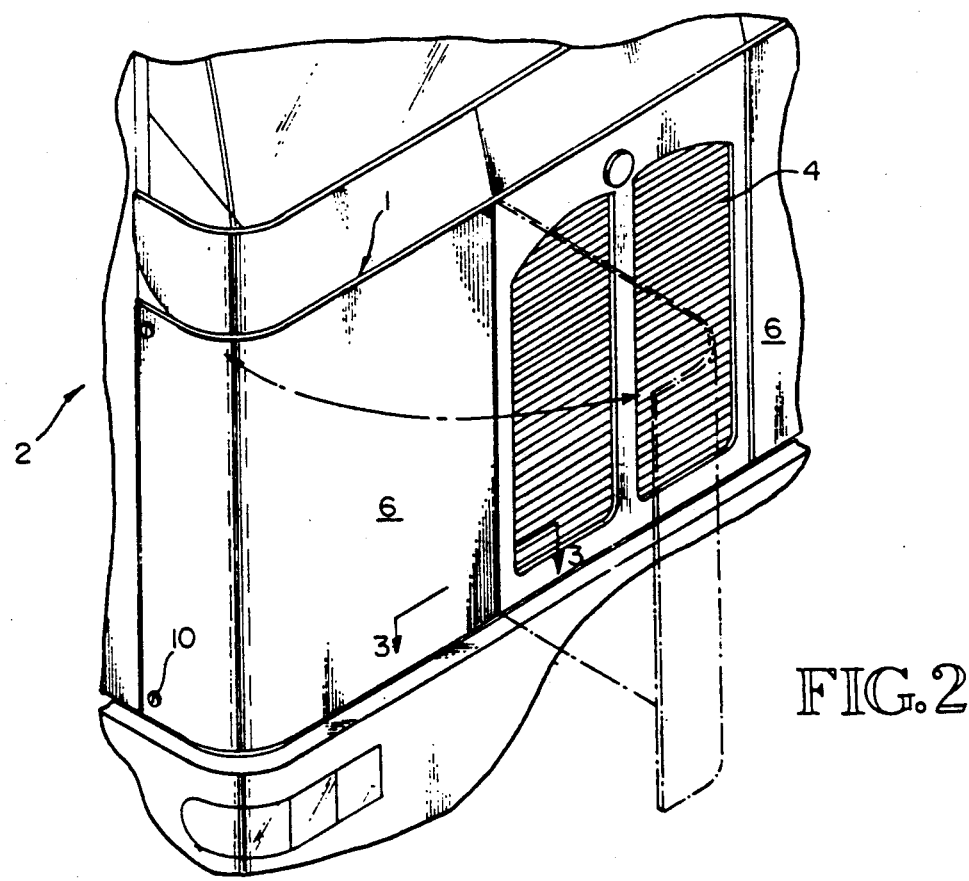
FIG. 2 is an isometric view with the corner panel swung closed.

FIG. 2 shows how the side corner panels wrap around the corners, fit flush with the body of the truck cab when closed, and are held closed by quick-release fasteners 10. Fasteners 10 can be any of several quick-release fasteners, for example, a conventional quarter-turn screw lock. Because of the similarity between the passenger's side and operator's side equipment compartments, only the passenger's side equipment compartment will be discussed.

FIG. 1 shows the corner panel swung open to permit access to the contents of the equipment compartment. Each compartment has a longitudinal sidewall 11 which forms an inner wall of the equipment compartment and is adjacent the radiator behind the grill 4. Panel members of the cab 2 form top 12 and rear 14 walls of the equipment compartment. The outer side wall 13 is formed by the exterior side panel of the truck cab. The compartment walls provide mounting surfaces for the truck's support equipment. According to one embodiment, the equipment compartment has no bottom wall, but rather opens to the ground.

The corner panel pivots on two vertically aligned pivot mounts 18. Each pivot mount includes a mounting bracket 20 fixed to side wall 11 by suitable fasteners. The bracket supports an integral vertical pivot pin 34. Pivotally mounted on the pivot pin is a swing assembly 36 which includes a first swing arm 38 having an eye 40 which receives the pivot pin. Connected to the first swing arm by a pivot joint 40 is a second swing arm 42 that connects by a pivot 46 to a mounting plate 48. The mounting plate 48 is fixed to the corner panel by suitable fasteners.

Figure 3:
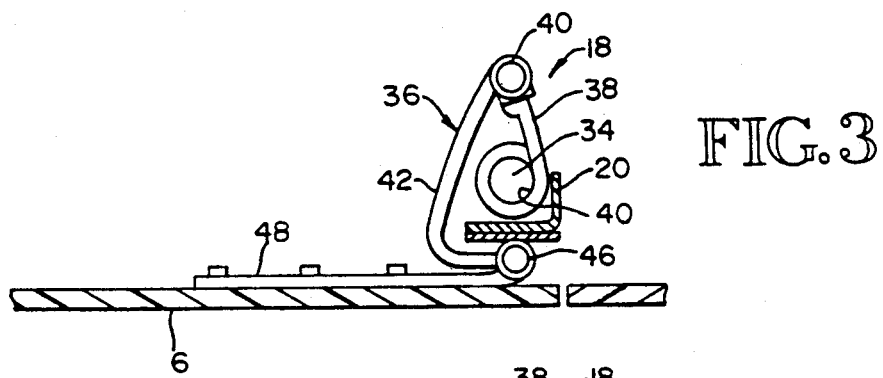
FIG. 3 is a horizontal fragmentary sectional view taken along lines 3—3 of FIG. 2.
Figure 4:
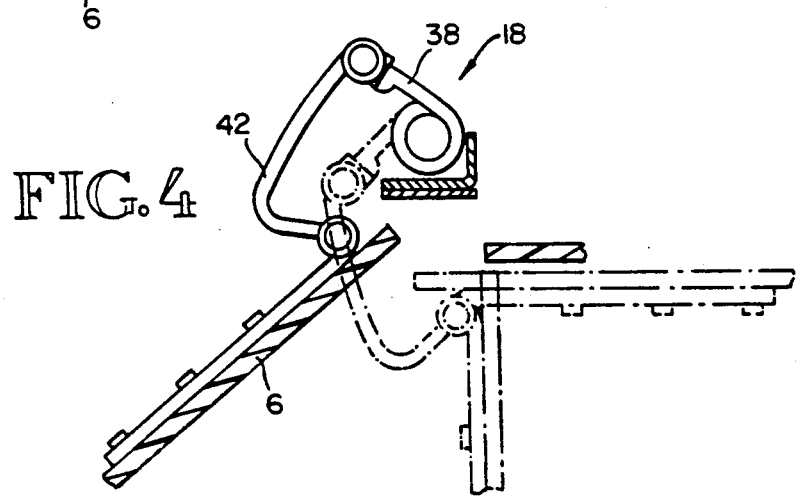
FIG. 4 is a horizontal fragmentary sectional view showing the panel swung open.

The operation and construction of the pivot mount are better understood with reference to FIGS. 3 and 4. FIG. 3 shows the relationship between the corner panel pivot mount 18 and sidewall 11 when the corner panel is closed. FIG. 4 shows the corner panel slightly opened. The corner panel is rotatable along an elliptical arc formed by the action of the rotatable pivots 40 and 46, and the pivot pin 34. As the corner panel is opened farther, the pivot mount articulates, causing the corner panel to swing open and to pivot forward, allowing the panel to swing completely clear of the entrance to the compartment approximately 180 degrees, as shown in phantom lines in FIG. 4.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for closing an equipment compartment located adjacent the front of a vehicle cab, comprising:
    a corner panel forming part of the exterior of the vehicle cab, said corner panel adapted for use with the equipment compartment and having a generally flat forward surface and a generally flat side surface combined at an angular curved corner; and
    means for pivotally attaching said corner panel to the vehicle cab and for swinging the corner panel about a vertical axis.

2. A vehicle cab comprising:
    an engine compartment having a forward firewall;
    an equipment compartment formed forward of the engine firewall adjacent the radiator;
    a corner panel closing said equipment compartment, said corner panel forming part of the exterior of said vehicle cab;
    pivot means for supporting the corner panel for swinging about a vertical axis between closed and open positions; and
    fastener means holding said corner panel closed on said equipment compartment.

3. The apparatus according to claim 2 wherein said equipment compartment contains air conditioning equipment.

4. The apparatus according to claim 2 wherein said equipment compartment contains a heater.

5. The apparatus according to claim 2 wherein said equipment compartment contains electrical protection devices.

6. The apparatus according to claim 2 wherein said pivot means provides for swinging the corner panel through approximately 180 degrees.

7. The apparatus according to claim 6 wherein said hinge is a triple articulating hinge.

8. The apparatus according to claim 7 wherein said triple articulating hinge includes:
    a fixed pivot pin;
    a first swing arm pivotally connected to said pivot pin at one end and having a second pivot connection at its opposite end;
    a second swing arm pivotally connected to the second pivot connection of said first swing arm;
    said second swing arm having a ninety-degree bend and having a third pivot connection at the end of the bend;
    a mounting plate for connecting to said corner panel; and
    said third pivot connection joining the second swing arm to said mounting plate.

9. The apparatus according to claim 1 wherein said equipment compartment contains air conditioning equipment.

10. The apparatus according to claim 1 wherein said equipment compartment contains a heater.

11. The apparatus according to claim 1 wherein said equipment compartment contains electrical protection devices.

12. The apparatus according to claim 1 wherein said pivot means provides for swinging the corner panel through approximately 180 degrees.

13. The apparatus according to claim 12 wherein said hinge is a triple articulating hinge.

14. The apparatus according to claim 13 wherein said triple articulating hinge includes:
    a fixed pivot pin;
    a first swing arm pivotally connected to said pivot pin at one end and having a second pivot connection at its opposite end;
    a second swing arm pivotally connected to the second pivot connection of said first swing arm;
    said second swing arm having a ninety-degree bend and having a third pivot connection at the end of the bend;
    a mounting plate for connecting to said corner panel; and
    said third pivot connection joining the second swing arm to said mounting plate.

* * * * *